Sept. 8, 1970  G. WINTRISS  3,527,073
FLUIDIC SYSTEMS FOR MALFUNCTION DETECTORS
Filed Dec. 15, 1967
2 Sheets-Sheet 1
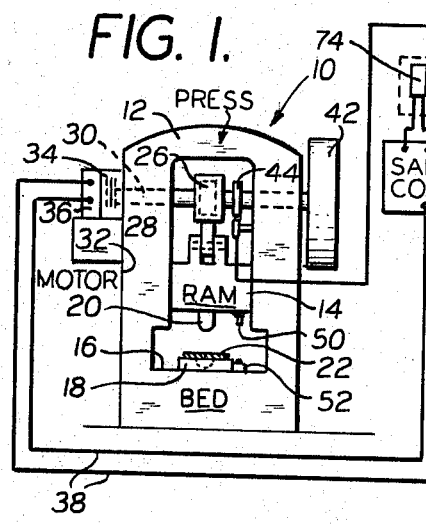
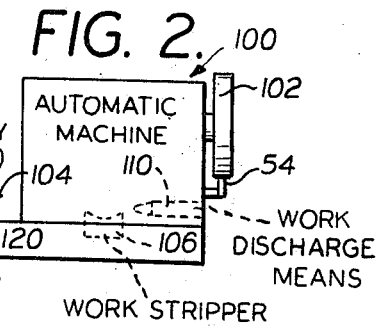
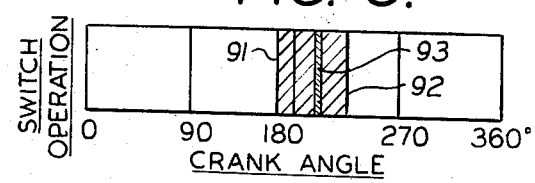
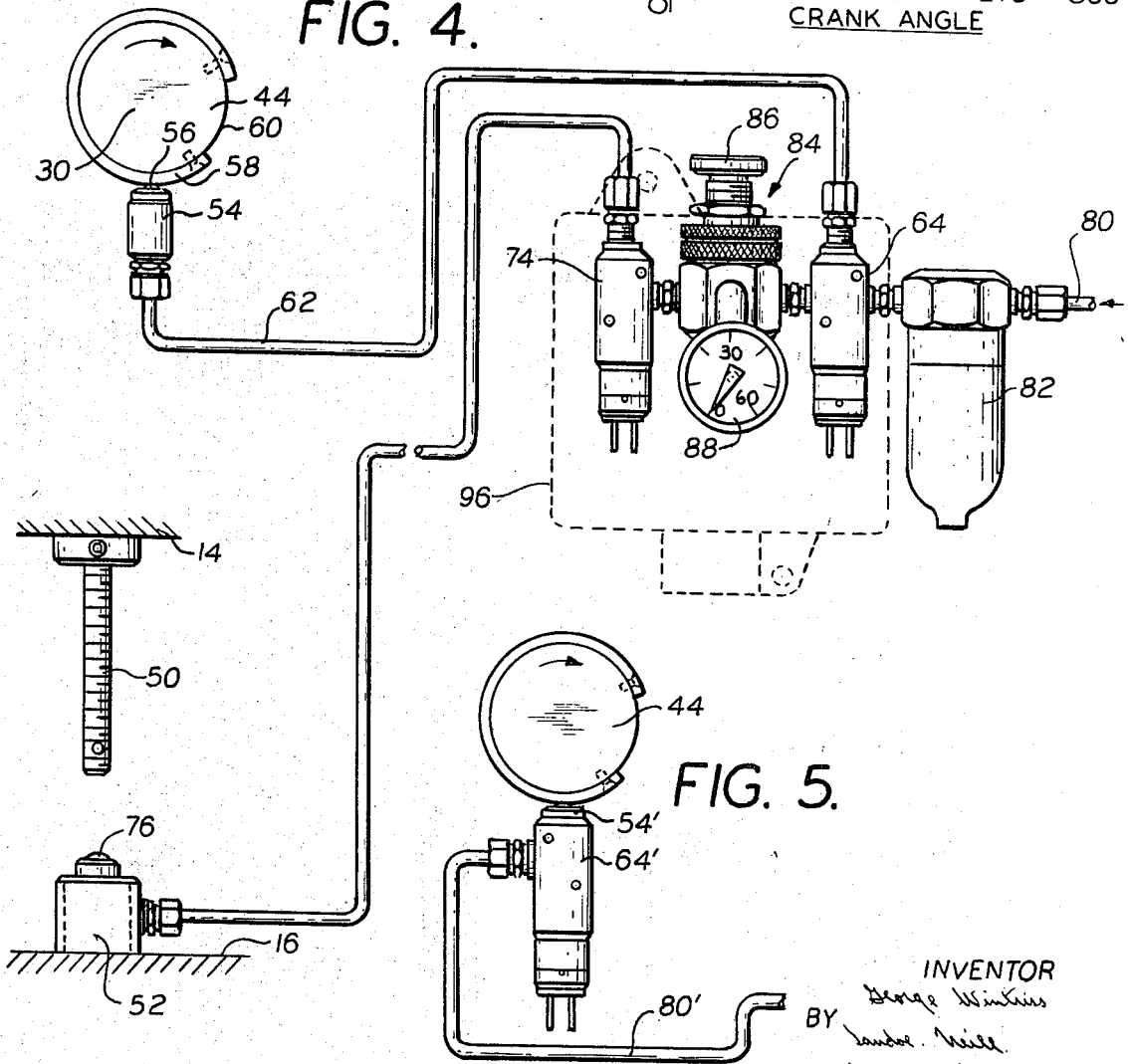
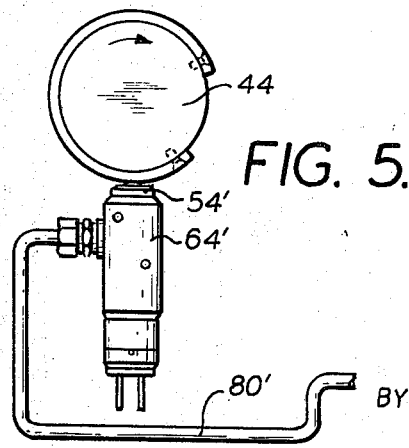
INVENTOR
George Wintriss
BY
ATTORNEYS.

Sept. 8, 1970        G. WINTRISS        3,527,073
FLUIDIC SYSTEMS FOR MALFUNCTION DETECTORS
Filed Dec. 15, 1967        2 Sheets-Sheet 2
FIG. 6.
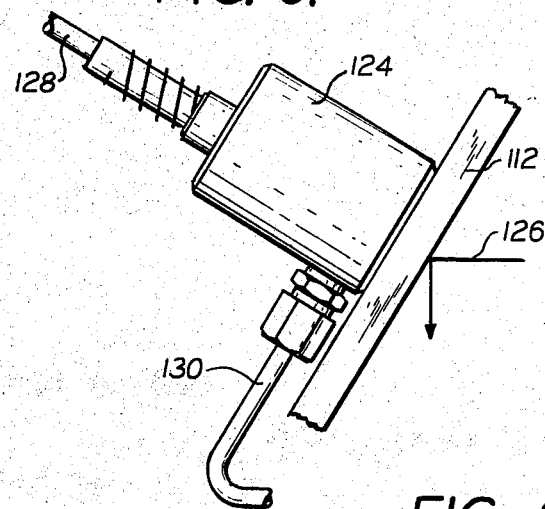
FIG. 7.
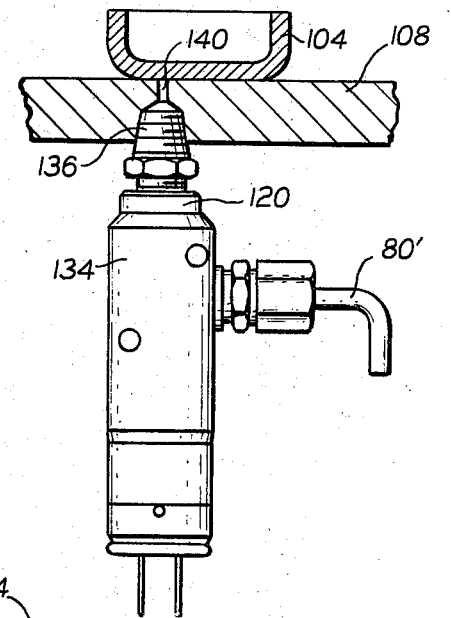
FIG. 8.
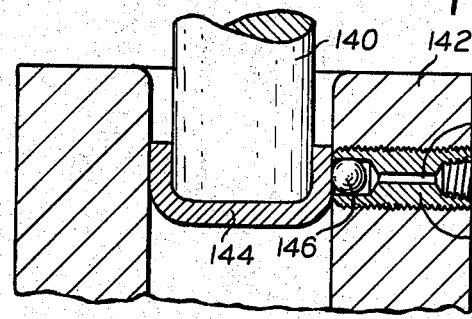
FIG. 9.
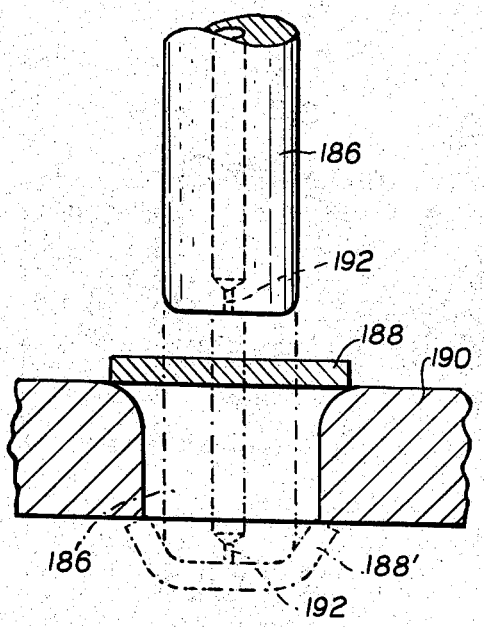
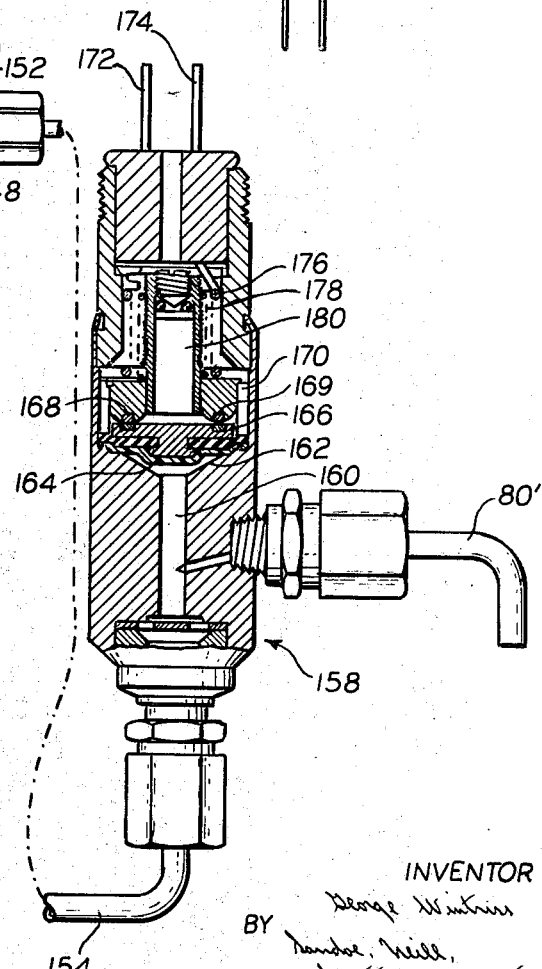
INVENTOR
George Wintriss
BY
ATTORNEYS.

United States Patent Office 3,527,073
Patented Sept. 8, 1970

3,527,073
FLUIDIC SYSTEMS FOR MALFUNCTION DETECTORS
George Wintriss, Carversville, Pa., assignor to Industrionics Controls, Inc., New York, N.Y., a corporation of New York
Filed Dec. 15, 1967, Ser. No. 690,958
Int. Cl. B21d 55/00
U.S. Cl. 72—4                    12 Claims

ABSTRACT OF THE DISCLOSURE

This specification discloses a safety control system for repetitive cycle automatic machines. A sensor is placed in a position to be operated, at least indirectly, by a part of the machine at the end of each successful operation of the machine on a work piece. "Successful operation" includes completing of a full stroke in a press, full closing of a die, and delivery of a finished work piece at a delivery station. The safety control, such as an automatic stop, clutch throw-out, is operated by a switch, valve, or other fluid device with a fluid actuator controlled from the pneumatic sensor. The device is preferably located remote from the sensor and its associated parts of the machine with only a tube of fluid extending between the sensor and the actuator. The preferred construction is a two pulse system with a cyclically operated sensor on the machine and the other sensor with its operation a function of the work piece progress. Sensitivity of the sensors is varied as necessary by changing the fluid pressure.

CROSS REFERENCE TO RELATED APPLICATIONS

There are a number of applications relating to the kind of fluidic systems with which this invention is concerned.

A fluid controlled electric switch responsive to interference with an air stream by a work piece passing along a transfer table is disclosed in my copending application Ser. No. 484,202 filed Sept. 1, 1965, now Pat. No. 3,358,096.

Control apparatus having an electric switch with an actuator having an aspirator action under a switch operating diaphragm is disclosed in my copending application Ser. No. 587,547 filed Oct. 18, 1966, now Pat. No. 3,440,374.

A number of fluidic systems with pressure-responsive electric switches are illustrated and described in my copending application Ser. No. 610,652 filed Jan. 20, 1967, now Pat. No. 3,443,044.

Two other copending applications Ser. No. 623,252 filed Mar. 15, 1967, now Pat. No. 3,422,234 and Ser. No. 637,411 filed May 10, 1967, now Pat. No. 3,443,045 disclose improved electric switches for use with fluidic systems.

BACKGROUND AND SUMMARY OF THE INVENTION

Control systems, particularly safety controls, for automatic machines are advantageously actuated by fluid sensors. The sensor may have a bleed passage from which a stream of fluid escapes and the sensor responds to any obstruction, deflection, or any change in the fluid stream; or the sensor may have a bleed passage commanded by a valve which opens to change the pressure in the sensor or to produce a rarefaction wave in the fluid. In the use of the term "fluid" herein, it should be understood that air is the preferred medium, but the term is used to designate any other suitable fluid that can be used as a substitute.

One object of the invention is to provide a control system in which one or more fluid sensors control the operation of electric switches, or other working fluid control devices through actuators, and the electric switches or other devices can be located remote from the sensors requiring only a pipe or tube connection between the sensor and the actuator that it controls.

Another object is to provide for change in sensitivity of the sensors and the actuators they control in a system of the character indicated. This provision for varying the sensitivity makes possible compensation, if it becomes necessary, for excessive lengths of pipe or tubing between the sensor and the actuator that it controls. The sensitivity is controlled by changing the pressure of the fluid used in the apparatus; higher pressure having the effect of making the sensors and the actuators they control less sensitive to small changes in the flow of fluid from the sensor.

The invention will be described with the sensor controlling an actuator which operates an electric switch, but in its broader aspects the electric switch can be replaced by a valve or fluid logic device or any device for controlling the flow of working fluid.

The preferred embodiment of the invention is a "two pulse" control system with one sensor that responds to the cyclic operation of the machine to condition the safety control for operation within a limited arc of the cycle. The second sensor when it detects, during said limited arc, the successful operation of the machine on the work piece for that cycle prevents the safety control from stopping the machine. If a pulse signal from the second sensor is not received during the condition cycle of the first sensor, that is, during the time when it should be received, safety controls stop the machine.

In describing a sensor as in position to be operated "at least indirectly" it is contemplated that the sensor may be operated by some part of the machine that moves as a unit with a ram, tool, or die part where the completion of a full stroke is an indication that there is no obstruction such as a former work piece not stripped in the preceding cycle. The sensor may be operated by the work piece itself as it is delivered by the machine and operation of the work piece under such circumstances is operation indirectly by the parts of the machine that cause the work piece to be delivered.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIG. 1 is a diagrammatic view of a press having a safety control and equipped with sensors in accordance with this invention;

FIG. 2 is a diagrammatic view showing the invention applied to an automatic machine which delivers work pieces to a delivery station;

FIG. 3 is a chart illustrating the operation of the pressure sensors of FIG. 1 with respect to the cycle of the machine and with respect to one another;

FIG. 4 is a greatly enlarged view showing the operating mechanism and the sensors of the press of FIG. 1 and showing the switch actuators connected with the sensors;

FIG. 5 is a fragmentary view showing a modification of part of the control system shown in FIG. 4;

FIGS. 6 and 7 are greatly enlarged views showing part of the control system shown in FIG. 2;

FIG. 8 is a sectional view showing the invention applied to a machine for making drawn parts; and FIG. 9 is a fragmentary view similar to FIG. 8 but showing a modified construction.

DESCRIPTION OF THE PREFERRED EMBODIMENTS

FIG. 1 shows a press 10 having a frame 12 and a ram 14 which is moved up and down along guides of the frame toward and from a bed 16 to which a guide 18 is attached. The ram 14 carries a tool 20 which operates on a work piece 22 shown located above the guide 18.

Each time that the ram 14 completes a cycle, a work piece supplied to the guide 18 is operated upon and then stripped from the guide before the next cycle. A new work piece is brought into position in accordance with conventional practice.

The ram 14 is operated from an eccentric 26 through a connecting rod 28. The eccentric is on a shaft 30 driven by a motor 32 through a clutch 34. This clutch 34 has a solenoid 36 by which the clutch is disengaged in response to an electric signal transmitted through conductors 38 from a controller 40. The shaft 30 carries a fly wheel 42 and a cam 44. One complete revolution of the cam 44 represents one cycle of operation of the press.

When the press 10 is operated in the intended manner, the ram 14 completes a predetermined stroke; but if a portion of the work is not stripped from the die 18, and the tool 20 descends upon a new work piece blank which is prevented from moving all the way into the die by the unstripped work piece, then the ram cannot complete its normal stroke. Yielding of the motion transmitting connections between the ram and the shaft 30 permits the press to continue to rotate, but the ram 14 does not come down as far as it did on its previous normal strokes. Thus the extent to which the ram 14 moves toward the bed 16 is a measure of the proper operation of the press and this operation can be determined by a feeler 50 which moves into contact with a sensor 52 at the bottom of a normal stroke.

FIG. 4 shows the cam 44 on the shaft 30, and shows a pneumatic sensor 54 with a valve element 56 in contact with the cam 44. This valve element 56 is a follower for the cam 44. In the construction illustrated, there is a band 58 attached to the cam 44 and forming the high part of the cam. Between the ends of the band 58, the cam 44 is of less radius. In the operation of the cam 44, the valve element 56 is displaced by the band 58 but moves into a normal closed position when an arc 60 of the cam, between the ends of the band 58, passes in front of the valve element 56.

The sensor 54 is connected by tubing 62 with a housing 64 which contains an electric switch and a switch actuator, the construction of which will be explained more fully in connection with FIG. 8.

For the present it is sufficient to understand that air is supplied from the housing 64 through the tubing 62 to the sensor 54. When the band 58 or high part of the cam 44 is in contact with the valve element 56, the air bleeds from the sensor 54 at a controlled rate. When the arc 60 of the cam 44 passes the valve element 56, the valve element closes in response to a spring bias and the flow of air from the sensor 56 is abruptly terminated and a shock wave travels back through the tubing 62 to the housing 64. This causes the actuator in the housing 64 to operate the switch in the housing. When the control system is operated with a slow speed press or other machine, the length of time that the air flow is shut may be long enough to permit a substantial build up of pressure in the housing 64 so that the actuator can operate on increased pressure rather than on a shock wave. Essentially the increased pressure and the shock wave are a pressure change, the difference being one of degree, and whether the actuator operates on one or the other depends upon its sensitivity which is adjustable in accordance with this invention.

FIG. 4 also shows the feeler 50 which is attached to the ram 14 and which touches the pneumatic sensor 52 at the bottom of the stroke of the ram 14 when the press is operating in its intended manner. This sensor 52 is connected by tubing 68 with a housing 74 which contains an actuator and a switch preferably similar to those in the housing 64. The pneumatic sensor 52 has a valve element 76 which prevents escape of air from the pressure sensor 52. When the ram 14 moves to the bottom of its normal stroke, the feeler 50 displaces the valve element 76 sufficiently to permit the escape of air from the pneumatic sensor 52 and this causes a shock wave to travel back through the tubing 68 to the housing 74. The shock wave from the sensor 52, caused by opening of the valve element 76 is a rarefaction wave instead of a pressure shock wave such as occurs when the valve element 56 stops the flow of air from the pneumatic sensor 54. It will be understood that the high and low arcs of the cam 44 could be interchanged provided the corresponding changes were made in the switching circuits.

Compressed air or the gas from a tank or other source comes through a supply line 80 and through a filter 82 to the housing 64. Beyond the housing 64 the compressed air flows through a pressure regulator 84 to the housing 74. The pressure regulator 84 has a knob 86 for adjusting the downstream pressure in the usual manner and there is preferably a gauge 88 for indicating the downstream pressure of the regulator 84.

FIG. 3 is a chart or graph showing the operation of the pneumatic sensors 52 and 54 and of the switches the housing 64 and 74, in FIG. 3 the cycle of the machine is divided into 360°. At approximately 165°, represented by the line 91, the pneumatic sensor 54 operates the switch in the housing 64 to condition the controller 40 (FIG. 1) for stopping the machine. The low arc on the cam 44 in FIG. 4 continues for approximately 60° and thus the conditioning switch remains closed until approximately 195° of rotation of the shaft as represented by the line 92 on the graph. The control mechanism such that the machine will stop before the crank angle reaches the line 92 unless the conditioning signal is cancelled by another signal from the switch in the housing 74 controlled by the pneumatic sensor 52.

In FIG. 3, the pneumatic sensor 52 is shown as operating at about 200° and the duration of the pulse signal from the switch in the housing 74, as produced in response to the operation of the pneumatic sensor 52, persists for only the short time represented by the double cross hatched band 93 of FIG. 3. This pulse represented by the band 93 cancels out the conditioning of the controller by the pulse beginning at the line 91 and thus permits the machine to continue operating.

Control mechanism operated by a conditioning pulse and a performance signal are well known and are not a part of this invention. Only so much of the control operation is described here as is necessary to explain the purpose of the apparatus of this invention.

There is the apparatus shown in FIG. 4, the pneumatic sensor 54, tubing 62, and the actuator and switch in the housing 64 constitute a cyclic-responsive conditioning assembly of this invention, while the pneumatic sensor 52, tubing 68, and the actuator and switch in the housing 74 constitute a performance signal assembly for the invention.

In the construction shown in FIG. 4 the housing 64, regulator 84 and housing 74 are all located close together and may be contained in a common controller box indicated in dotted lines and designated by the reference character 96. It is often necessary to have this apparatus located remote from the sensors 52 and 54 because there is not room for the housings 64 and 74 where the sensors are located.

FIG. 5 shows a modified construction in which the pneumatic sensor, indicated by the reference character 54' is located in a housing 64' and the entire assembly is positioned adjacent to the cam 44. The compressed air, or other gas, for the sensor and the actuator is supplied through tubing 80'.

FIG. 2 shows the invention applied to an automatic machine 100 which has a fly wheel 102 which makes one revolution for each cycle of the machine. This machine produces work pieces designated by the reference character 104. Each work piece is stripped by a work stripper 106 and there are means for discharging the work from the stripper station to a delivery station 108. The means for discharging the work is shown diagrammatically as a blower 110 which directs a jet of air against the work piece, this being a common form of discharge means for automatic machines.

The work pieces 104 travel along the delivery station 108 and into contact with a deflector 112. From the deflector 112 the work pieces drop into a tote box 114, or other container.

The cyclic responsive conditioning assembly in FIG. 2 includes a pneumatic sensor 54 which is a follower for a cam surface on the fly wheel 102. The other structure of the cyclic responsive conditioning assembly is not shown in FIG. 2 since it is similar to that of FIG. 4. The performance signal assembly includes a pneumatic sensor 120 located at the delivery station 108, and the construction of which will be explained in connection with FIG. 7.

FIG. 6 shows a modified construction for use with the deflector 112 shown in FIG. 2. Instead of using the pneumatic sensor 120 of FIG. 2 the deflector 112 can have an impact switch 124 connected to it so that work pieces striking the plate 112 as indicated by the arrow 126 operate the impact-responsive switch 124 to produce the performance signal pulse. The switch 124 is an electric switch connected with the circuits of the controller by conductors in a cable 128 and the sensitivity of the switch is adjusted by controlling the loading pressure in a chamber behind a diaphragm, the air for loading the switch being supplied through tubing 130. There are numerous impact operated switches available and the switch 124 is merely representative of a switch operated by the impulse of the work piece striking it or an attached plate. The controlling of the sensitivity of the switch by changing the loading supplied by air pressure is disclosed in my copending patent application Ser. No. 680,878 filed Nov. 6, 1967, now Pat. No. 3,472,979.

FIG. 7 shows the work piece 104 travelling through the delivery station 108 of FIG. 2. The pneumatic sensor 120 consists of a chamber in a housing 134 attached to the delivery station 108 with a fitting 136 having an air outlet in register with an opening 140 through the surface of the delivery station along which the work pieces 104 travel. Whenever there is no work piece over the opening 140, air bleeds through this opening from the pneumatic sensor 120. Whenever a work piece travels across the opening 140 and deflects or obstructs the air flow, a shock wave travels back through the pneumatic detector 120 to operate an actuator in the housing 134. This actuator operates a switch in the housing and the assembly is similar to that shown in FIG. 5 where the pneumatic sensor, the switch actuator and the switch are contained in a common housing. Air is supplied to the housing 134 through tubing 80'. The difference between FIG. 7 and FIG. 5, in the operation of the pneumatic sensor, is that there is no valve element and air bleeds from the sensor continuously except when obstructed by a work piece. The same operation can be used with the cam 44 of FIG. 5 or any other moving part of a machine where the flow continues except when shut off by movement of a part of the machine into close proximity with the air outlet.

FIG. 8 shows another modification of the invention and shows the internal construction of the actuators and switches which are contained in the housings 64 and 74 of FIG. 4, the housing 64' of FIG. 5 and the housing 134 of FIG. 7, though the apparatus in FIG. 8 is differently oriented.

In FIG. 8 the movable part of the cyclically operated machine is a plunger 140 which moves into a die 142 to draw a work piece 144. When the apparatus is operating in the intended manner, the drawn work piece 144 moves downward in the cavity of the die 142 and displaces a valve element consisting of a ball 146. This ball 146 is located in a counterbore of a bushing 148 and the end of the counterbore is shaped to provide a somewhat reduced diameter on which the ball 146 seats when moved to the limit of its travel toward the left in FIG. 8. When thus seated, the ball 146 prevents the escape of air from within the bushing 148. A center bleed passage 150 leads from the counterbore back to a fitting 152 to which air is supplied through tubing 154.

The tubing 154 connects with a housing 158 and compressed air is supplied to the housing 158 through a supply line 80'.

Within the housing 158 there is a longitudinal extending passage 160 which communicates at its upper end with a chamber 162 having a flexible diaphragm 164 closing the upper end of the chamber 162. A movable contact holder 166 is riveted to the inner lamination of the flexible diaphragm 164. Fixed contacts 168 and 169 are located above the movable contact 166 and are held in place by a ring 170 constructed of insulating material. This ring clamps the circumferential edge region of the flexible diaphragm 164.

The fixed electric contacts 168 and 169 are connected with prongs 172 and 174, respectively by helical conductors 176 and 178, respectively. The actuator for the switch in the housing 158 is the diaphragm 164 and the air chamber which is closed at its upper end by the diaphragm. This actuator also includes a spring which presses against the movable electric contact and through this contact against the flexible diaphragm 164 in a direction opposite to the pressure exerted by the air in the chamber 162. The switch consists of the movable contact 166, the fixed contacts 168 and 169 and the parts which hold these contacts.

The switch consisting of the contacts 166, 168 and 169 is held closed by air pressure in the chamber 162 exerting a force slightly greater than the force of the spring 180. When the ball 146 is displaced by the work piece 144 so that air can escape through the bleed passage around the clearance between the ball 146 and the counterbore, and the clearance between the work piece 144 and the die 142, a rarefaction shock wave through the tubing 154 causes the spring 180 to temporarily open the switch and produce the performance signal. Even though the switch is operated with a pneumatic sensor which shuts off the flow of air, such as the sensor 120 of FIG. 7, the shock wave produces a sudden increase followed by a decrease in pressure so that the switch opens in the same way as where the rarefaction wave precedes the pressure wave. As previously explained, with slow speed operation of the machine or other equipment with which this invention is used, the pressure change in the chamber 162 may be of a different character caused by the movement of a substantial volume of air rather than by a shock wave. The sensitivity of the actuator, and the resulting sensitivity of the switch operation, depends upon the pressure supplied to the chamber 162. This pressure is adjustable by means of the regulator 84 in FIG. 4 and by changing the delivery pressure of the fluid supplied to the actuator 158 through supply line 80′, from a similar regulator in FIGS. 5, 7 and 8.

In the assembly shown in FIG. 4, the cyclic responsive conditioning assembly is supplied with full pressure from the supply line 80 since there is no reason for adjusting the sensitivity of the actuator for the switch in the cyclic responsive conditioning assembly. This assembly can be supplied with the regulated pressure, however, where the connections are simplified by having all of the pneumatic sensors and actuators supplied from the downstream side of the adjustable regulator, but there are some advantages in having the volume of space which communicates with the downstream side of the regulator kept as small as possible.

FIG. 9 shows a tool 186 which reciprocates up and down for drawing work piece blanks 188 through a die 190. Air supplied to the tool 186 bleeds from an orifice 192 in the bottom face of the tool 186. When the tool contacts with each successive work piece, the flow of air from the bleed orifice 192 is shut off by the work piece blank. Successive blanks 188 are fed to the die 190 below the tool by conventional feed mechanism once in each cycle of the press.

When the tool 186 has pushed the work piece blank 188 through the die 190, the blank is drawn to form the shaped work piece 188′; and the sides of the work piece 188′ spring apart to some extent as they clear the lower end of the die. As the tool 186 starts its upward stroke, the spread sides of the work piece 188′ strike against the bottom of the die and the workpiece is thereby stripped from the tool 186. Air can then flow from the orifice 192.

This resumption of the air flow from the orifice 192 produces a pressure pulse in the air passage and produces the performance signal which must occur during the conditioning signal period in order to have the control apparatus permit the press to keep on running. If the work piece 188′ is not stripped from the tool at the end of each down stroke, there is no performance signal.

The preferred embodiments of the invention have been illustrated and described, but changes and modifications can be made and some features can be used in different combinations without departing from the invention as defined in the claims.

What is claimed is:

1. In a control system for an automatic machine that runs through repetitive cycles to perform operations on work pieces, means for supplying signals to a controller, means for supplying a working fluid under pressure, an actuator for the means for supplying signals, and to which the fluid is supplied, a sensor to which the fluid is also supplied, the sensor being located in position to be operated, at least indirectly, from the machine each time that the machine properly operates on a work piece, a fluid supply line connecting the actuator with the sensor, the means for supplying the fluid including a pressure regulator through which fluid flows, and means for changing the outlet pressure of the regulator to change the sensitivity of the sensor.

2. The combination described in claim 1 characterized by the system having a cyclic-responsive conditioning assembly and a performance signal assembly, each assembly including a fluid pneumatic actuator and a sensor, the means for supplying fluid under pressure leading to both assemblies, the cyclic-responsive conditioning assembly being connected with the supply line on the upstream side of the regulator, and the performance signal assembly being connected with the supply line on the downstream side of the regulator.

3. The combination described in claim 2 characterized by the performance signal assembly including an actuator having a fluid chamber and a movable wall of the chamber responsive to changes in the fluid pressure therein, the chamber being in communication with the fluid supply line, a passage for the outflow of fluid from the chamber, the exit end of said passage being in position to have the outflow of fluid affected by the passage of a work piece from a machine with which the control system is used.

4. The combination described in claim 2 characterized by the cyclic-responsive signal assembly including an actuator having a fluid chamber and a movable wall of the chamber responsive to changes of the fluid pressure therein, the chamber being in communication with the fluid supply line, a passage for the outflow of fluid from the chamber, the exit end of said passage being in position to have the outflow affected by the movement of a part that is connected with a movable machine part that operates on the work piece.

5. The combination described in claim 2 characterized by said control system being combined with a machine, the cyclic-responsive conditioning assembly having a portion adjacent to one part of the machine, the performance signal assembly having a portion adjacent to another part of the machine, at least one of the assemblies having means for controlling flow of working fluid with an actuator remote from the portion of the assembly that is adjacent to said part of the machine and connected thereto by a fluid-filled tube.

6. The combination described in claim 5 characterized by means for supplying signals in both of the assemblies being electric switch means and the actuators being pneumatic and located at a common control station, and the actuators of both of the assembly switch means being remote from the portion of the assembly that is adjacent to said part of the machine.

7. The combination described in claim 5 characterized by the portion of the assembly that is adjacent to a part of the machine and remote from its switch actuator being a bleed passage with a valve for controlling flow of gas from the bleed passage, the valve being a remote control means for the pneumatic actuator.

8. The combination described in claim 5 characterized by means for stopping the operation of the machine, a controller for the means for stopping the operation of the machine, said controller being connected to and operated by the switches of the cyclic-responsive condition assembly and the performance signal assembly.

9. In a control system for a machine that runs through repetitive cycles to perform an operation on successive work pieces, including in combination a fluid flow responsive sensor for location adjacent to a cyclicly moving part of the machine, a second fluid flow response sensor for location in position to be operated, at least indirectly, from the machine each time the machine properly operates on a work piece, fluid-operated actuators connected with each of the sensors, at least one of the sensors being remote from its associated actuator and being connected thereto by a length of fluid-filled tubing, and signal switches operated by said actuators.

10. In a control system for an automatic machine that runs through repetitive cycles to perform operations on work pieces, means for producing a cyclic conditioning signal in each cycle for a time that overlaps a time of performance completion of the machine, means for producing a performance signal including a fluid passage having a bleed orifice through which fluid flows at a location adjacent to a work station, the outlet end of the fluid passage being in position to have the rate of fluid flow from the bleed orifice changed by the movement of a tool of the machine.

11. The combination described in claim 10 characterized by a tool of the machine with the fluid passage leading through the tool and the bleed orifice opening through a surface of the tool that contacts with the work piece during a part of the cycle of operation of the machine.

12. The combination described in claim 11 characterized by a machine including a die through which successive work pieces are drawn by a tool that pushes each work piece through the die and into a position where the work piece clears the lower end of the die and springs outward so that the work piece strikes the bottom of the die and is stripped from the tool as the tool begins its upward stroke, the bleed orifice being located in the bottom face of the tool which pushes against the center portion of the work piece.

References Cited

UNITED STATES PATENTS

| | | | |
|---|---|---|---|
| 2,287,283 | 6/1942 | Weber | 72—8 |
| 2,871,811 | 2/1959 | Gietl | 72—21 |
| 3,070,143 | 12/1962 | Klingler | 72—25 |

FOREIGN PATENTS

| | | |
|---|---|---|
| 1,349,034 | 12/1963 | France. |
| 1,170,893 | 9/1960 | Germany |
| 531,213 | 12/1940 | Great Britain. |

RICHARD J. HERBST, Primary Examiner

U.S. Cl. X.R.

72—31, 347, 361, 421; 192—125